Figure 1:
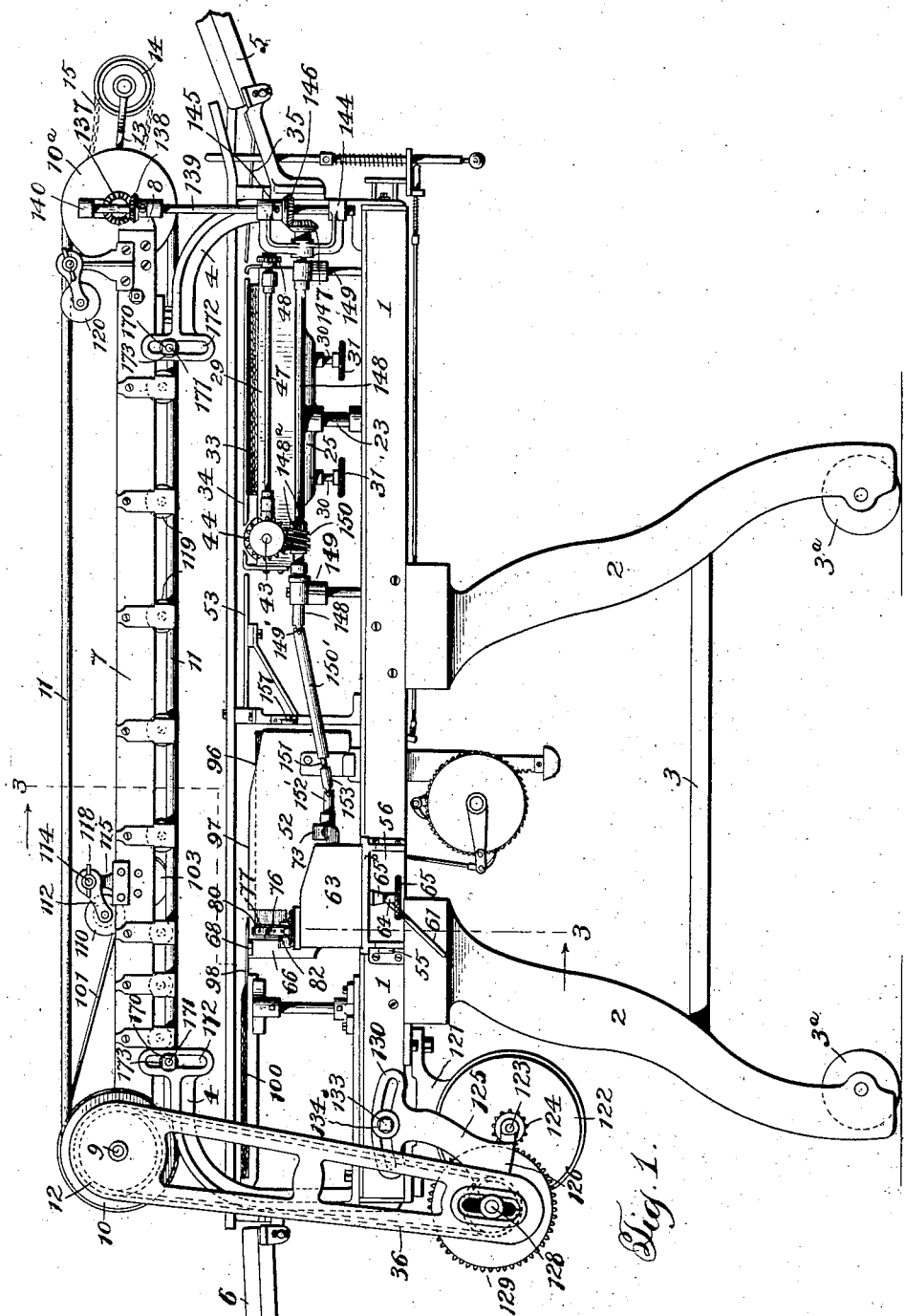

W. H. LEISTER.
LABELING MACHINE.
APPLICATION FILED AUG. 25, 1910.

1,189,844.

Patented July 4, 1916.
8 SHEETS—SHEET 1.

Witnesses:
Jas. E. Hutchinson
Geo. D. Riley

Inventor:
William H. Leister,
By T. McMillan Attorneys

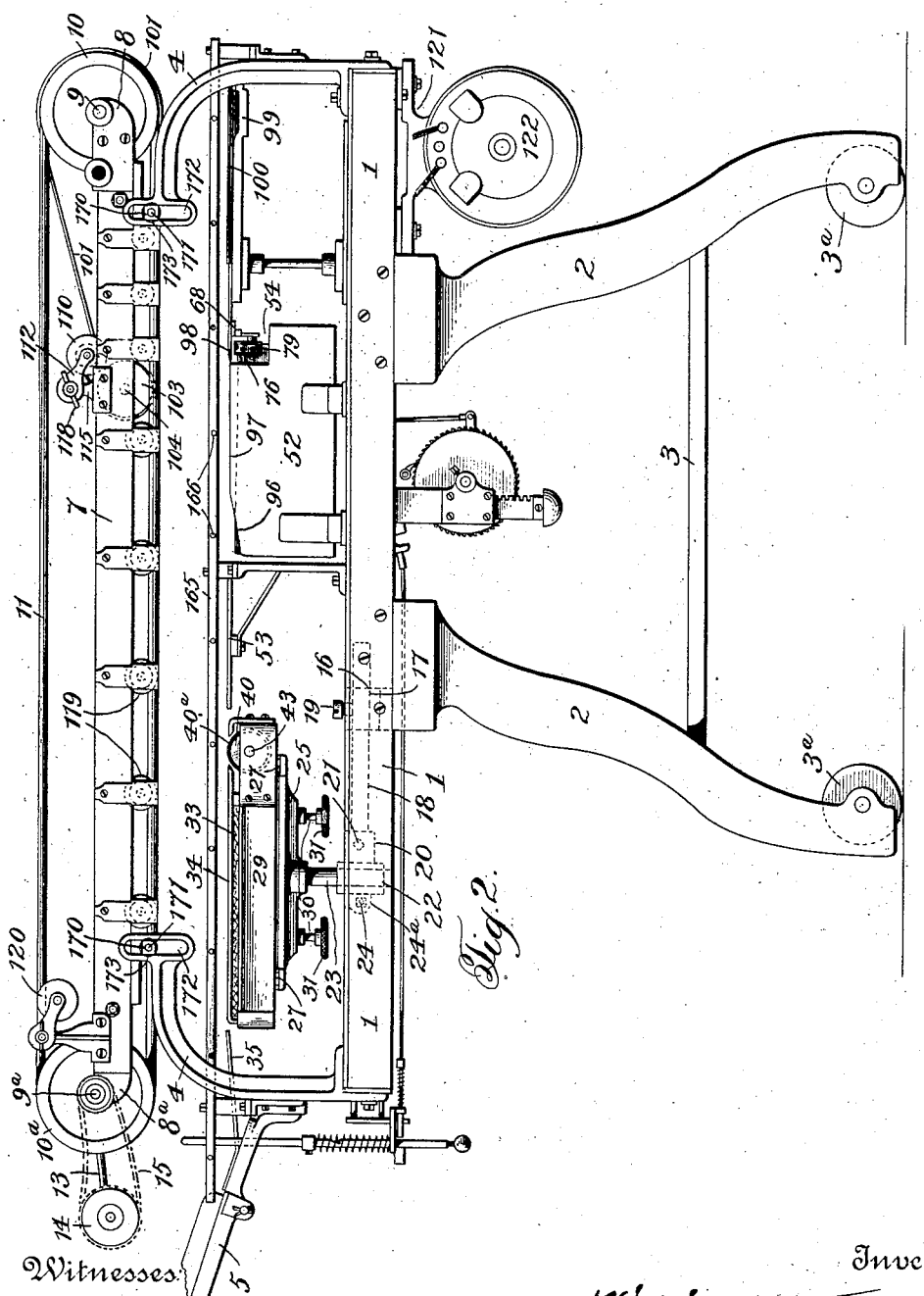

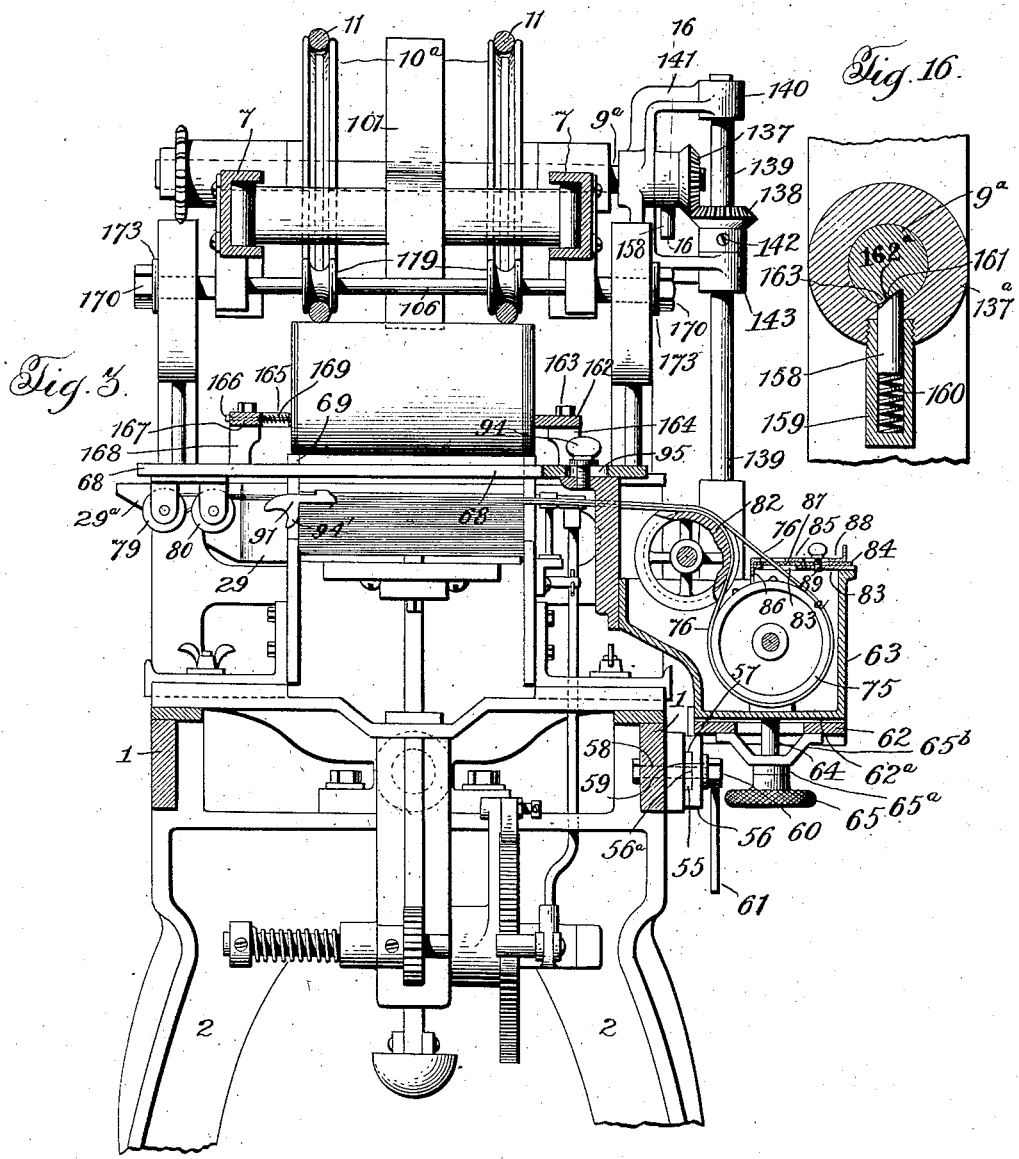

W. H. LEISTER.
LABELING MACHINE.
APPLICATION FILED AUG. 25, 1910.
1,189,844.
Patented July 4, 1916.
8 SHEETS—SHEET 4.
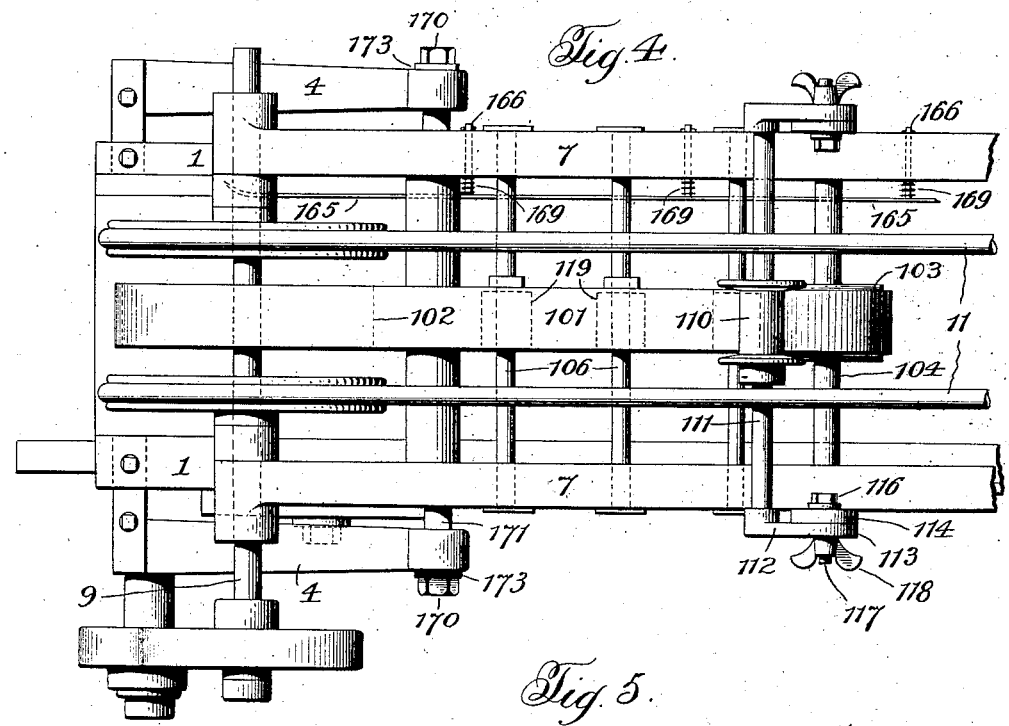
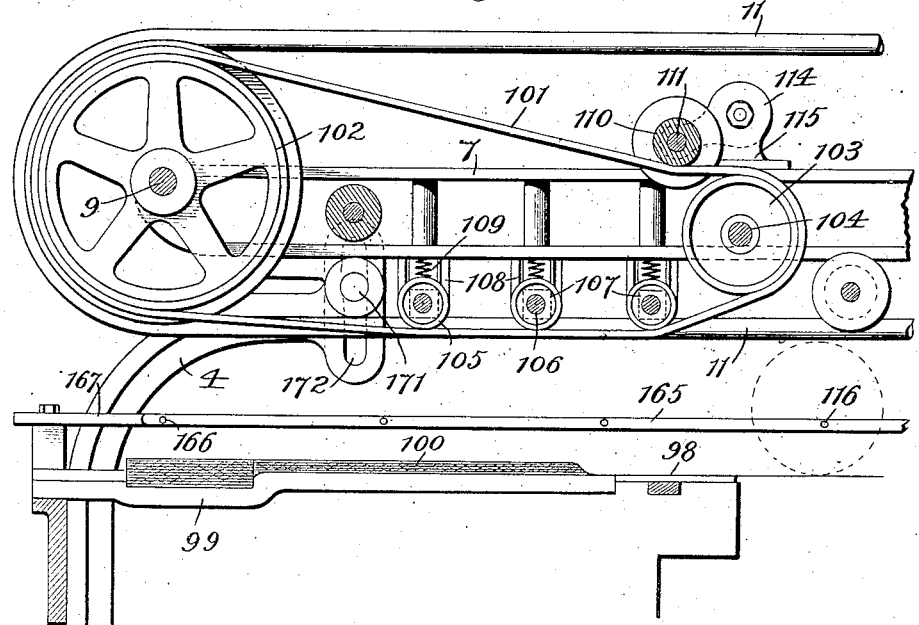
Witnesses:
Jas. E. Hutchinson
Geo. D. Riley
Inventor:
William H. Leister,
By Warren Means
Attorneys

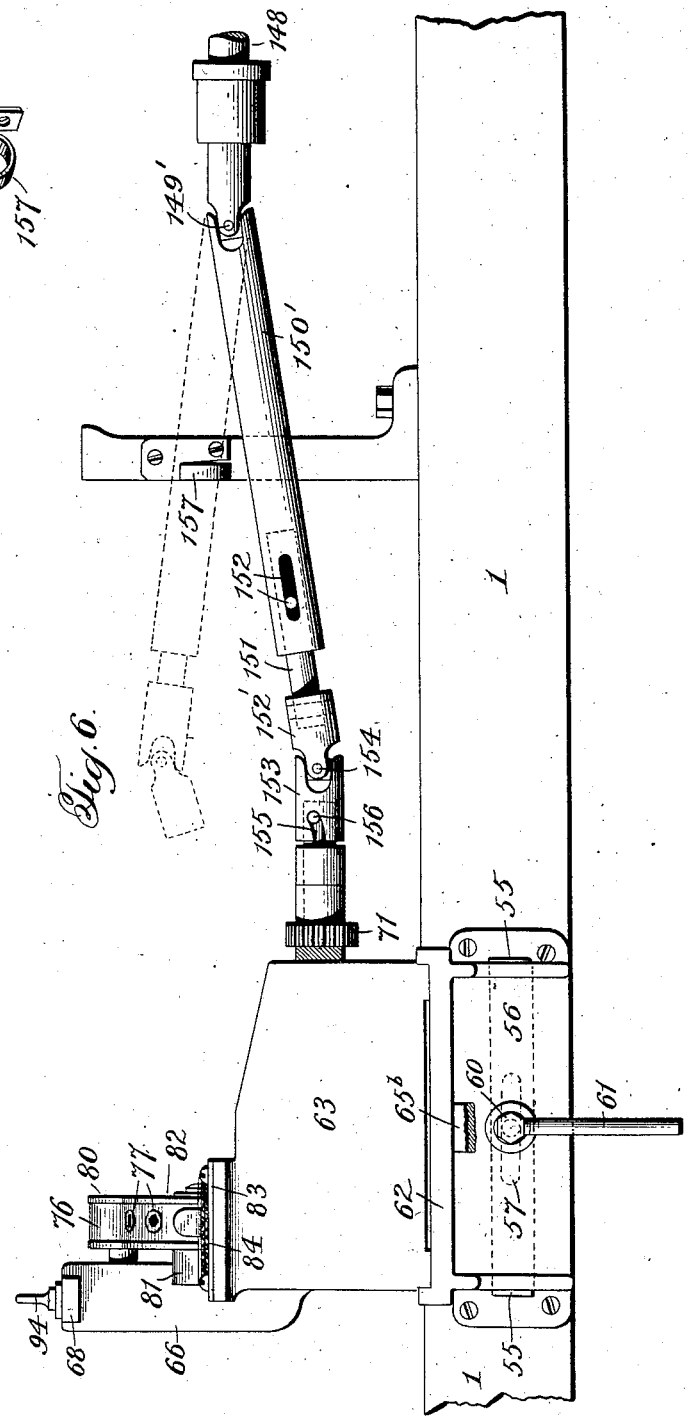

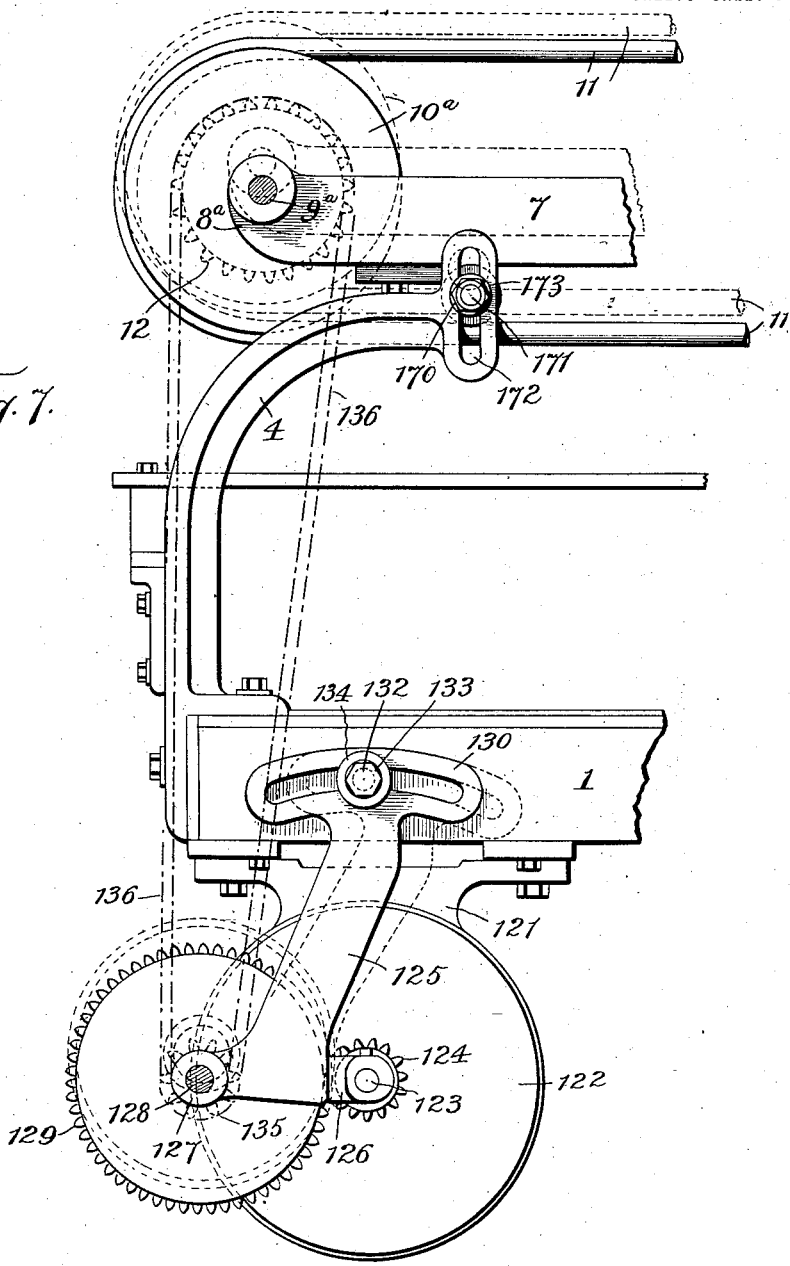

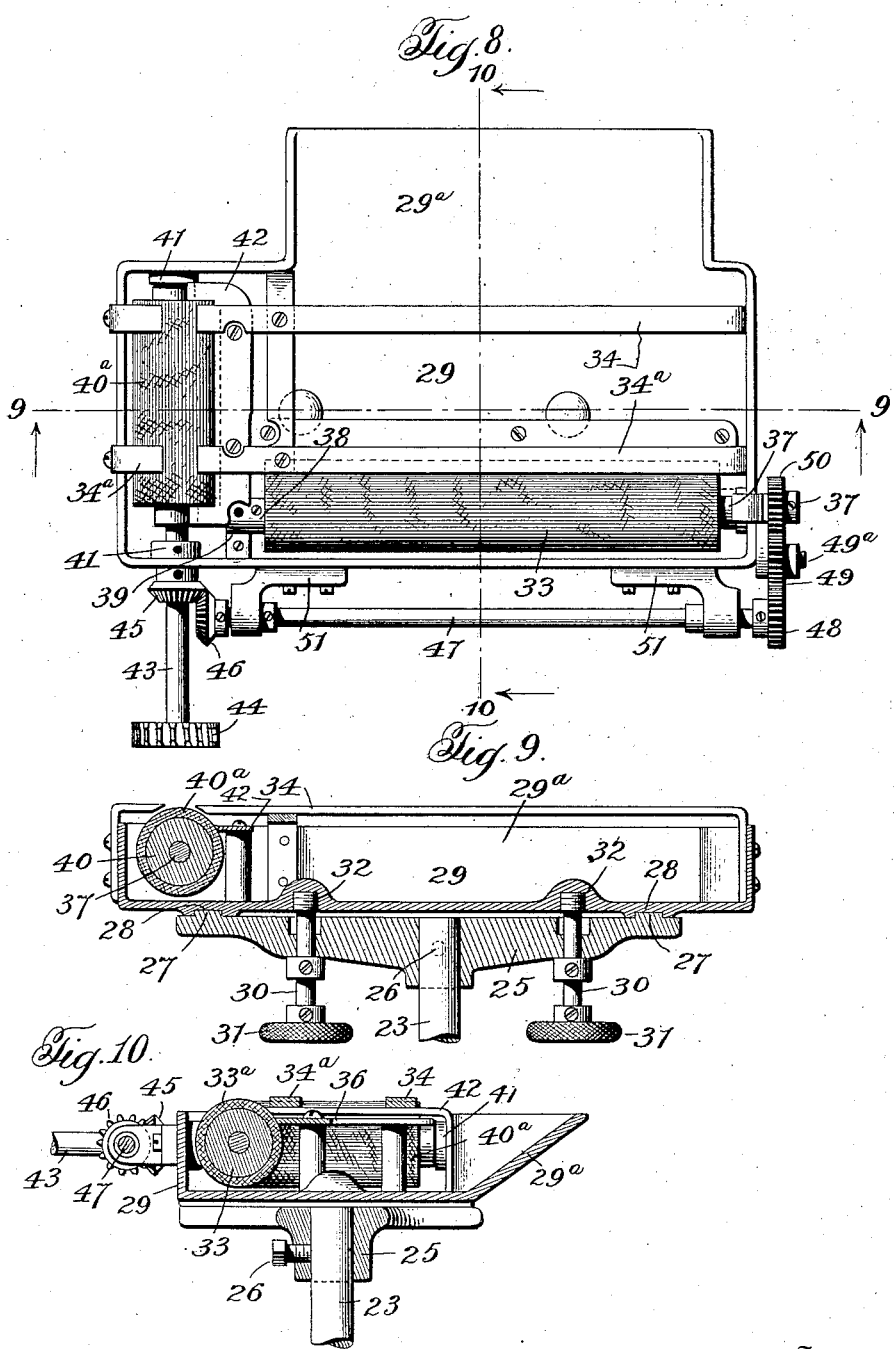

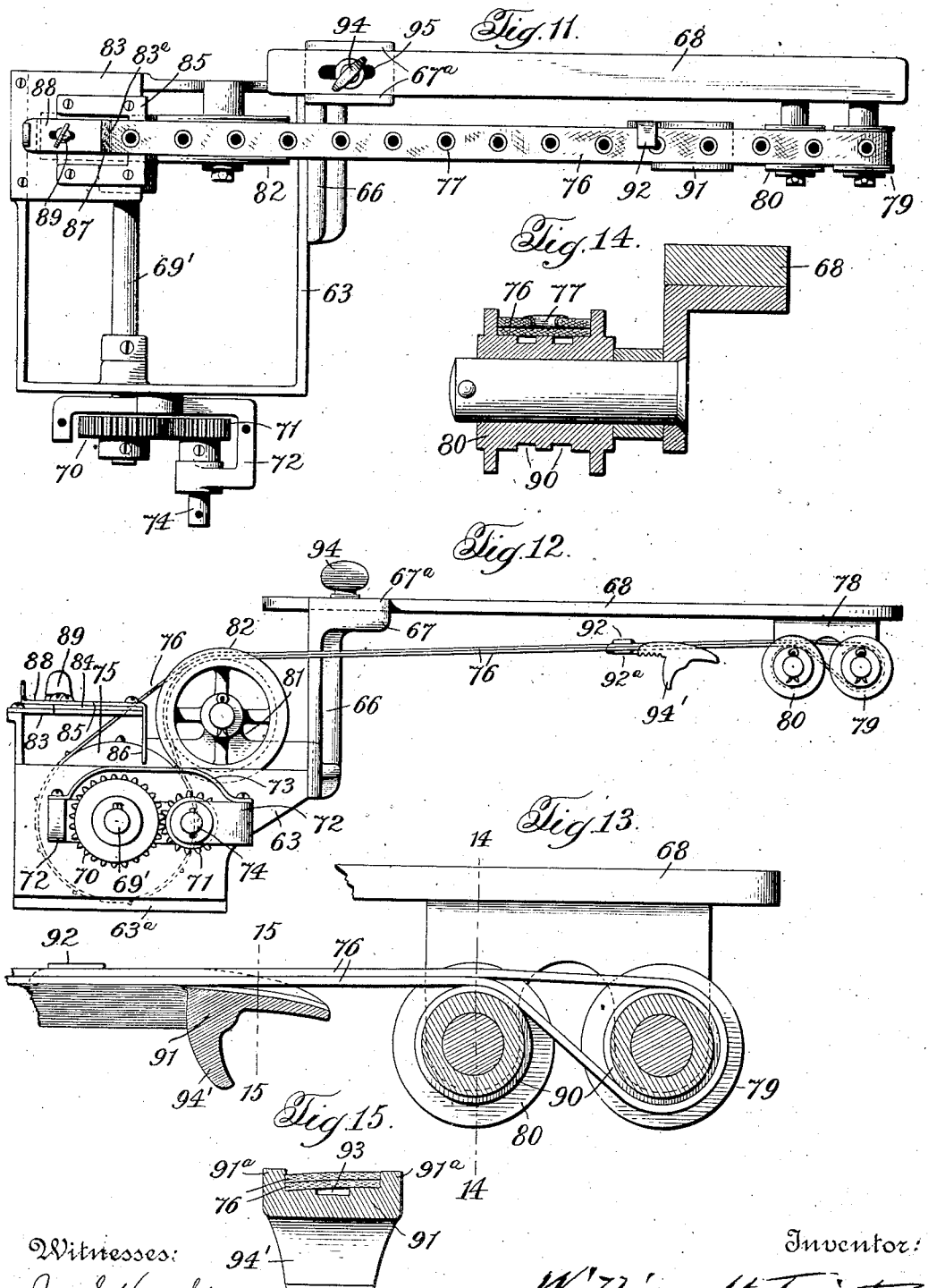

UNITED STATES PATENT OFFICE.

WILLIAM H. LEISTER, OF WESTMINSTER, MARYLAND, ASSIGNOR, BY MESNE ASSIGN-
MENTS, TO BURT MACHINE COMPANY, OF BALTIMORE, MARYLAND, A CORPORA-
TION OF DELAWARE.

LABELING-MACHINE.

1,189,844.   Specification of Letters Patent.   Patented July 4, 1916.

Application filed August 25, 1910. Serial No. 578,911.

*To all whom it may concern:*

Be it known that I, WILLIAM H. LEISTER, a citizen of the United States, residing at Westminster, in the county of Carroll and State of Maryland, has invented certain new and useful Improvements in Labeling-Machines, of which the following is a specification, reference being had therein to the accompanying drawing.

This invention relates to labeling machines and more particularly to machines of the character stated adapted to apply and affix to a can, box, or other package, a label, while the package is being fed along the machine.

The machine constituting the subject matter of the present invention while capable of labeling articles or packages of a variety of different types is primarily designed for the labeling of cans or packages having a previously applied top or lid, and includes novel instrumentalities for so applying the label that the latter constitutes a sealing medium for the can or package at the junction of the body of the can or package with the top or lid therefor, thus providing a seal at this point and making the contained goods moisture and air-proof.

In carrying out the idea just mentioned a novel form of pasting mechanism is employed, one adapted in its operation, to thoroughly coat the can or package for a limited width extending entirely therearound, whereby the label will be applied to the can at this point, and the body of the label will be left substantially free, thereby obviating stretching and wrinkling of the label as is the case when paste is applied to the entire surface. The present pasting mechanism preferably includes a paste applying member, shown for convenience in the form of a roll and rotatable about an axis extending longitudinally of the machine operating to apply, by a sweeping movement, the paste to and over the edge of the can or package lid or top, whereby the paste will be applied at every point of the junction between the top and body, and in a more effective and thorough manner than is possible with machines heretofore constructed.

One of the primary features of the invention may therefore be said to reside in the provision of a paste applying member rotatable on an axis extending longitudinally of the direction of feed of the can, and of a length to thoroughly apply a coating of paste entirely around the can, as the latter moves over the paste applying member.

For convenience in the present description, the article to be labeled, whether a can, box or other package will be usually referred to as a can.

The invention also relates to improvements in the feeding mechanism for the cans, and includes mechanism whereby the machine is susceptible of ready adjustment for feeding cans of different sizes, and this without the necessity of adjusting the runway or support for the cans, thus vastly increasing the utility of the machine.

Also the invention contemplates an improved form of guide or rail for the end or ends of the cans, for properly guiding the latter as fed along the runway, the object being to present a rail which is continuous and of yieldable material, whereby the same may readily adapt itself to the can at every point of the runway.

The invention also embraces means whereby a single paste pot or receptacle is adapted to supply paste to what may be termed the sealing paste member previously described and that paste member designed to apply a daub of paste across the surface of the can whereby the can will take up one end of the label, and in this connection, these two pasting members are so arranged, that they may be simultaneously adjusted by an adjustment of the paste receptacle, and a novel form of coöperating drive between these two pasting members is employed.

There is also embodied in the invention a novel form of driving mechanism for the various parts of the machine, one which permits of the adjustment of the various parts to adapt the machine to different sized cans as well as different sized labels, and which will permit of the can being returned by a reverse movement of the can feeding mechanism, while automatically stopping or locking against operation the driving mechanism for the other parts of the machine.

Still further the invention comprises an improved means for thoroughly pressing or ironing the label about the can after it has been applied, thereby eliminating wrinkling of the label and affixing the same firmly and snugly about the can.

Lastly, the invention comprises a can labeling machine, embodying a vast number of improvements in the details of construction, arrangement and simplification of parts, making a practical, economical, durable and efficient machine, the said parts to be more particularly referred to hereinafter in the detailed description, which, for a clear understanding of the invention should be considered in connection with the accompanying drawings, forming a part hereof, and wherein is disclosed, for the purpose of illustration, a convenient and satisfactory embodiment of the invention.

In the drawings: Figure 1 is a front side elevation of the machine, Fig. 2 is a rear side elevation of the machine, Fig. 3 is an enlarged transverse section on the line 3—3 of Fig. 1, looking in the direction of the arrow, Fig. 4 is an enlarged top plan view disclosing more clearly the presser belt, Fig. 5 is an enlarged longitudinal section of the presser mechanism, Fig. 6 is an enlarged detail of a portion of the driving mechanism for the pressing mechanism of the lap end of the label, Fig. 7 is an enlarged side elevation of the adjustable drive for the conveyer mechanism, Fig. 8 is a plan view of one of the paste receptacles and the pasting members mounted thereon, Fig. 9 is a longitudinal section on the line 9—9 of Fig. 8, Fig. 10 is a transverse section on the line 10—10 of Fig. 8, Fig. 11 is an enlarged plan view of the pasting receptacle and pasting mechanism for the lap end of the label, Fig. 12 is a side elevation of the same, Fig. 13 is an enlarged detail view of the end of the supporting arm or bracket for the lap end pasting belt, and the paste guard or shoe connected to the latter, Fig. 14 is a cross section on the line 14—14 of Fig. 13, Fig. 15 is a detailed sectional view on the line 15—15 of Fig. 13, Fig. 16 is a similar view on the line 16—16 of Fig. 3, and Fig. 17 is a detail perspective view of the shaft retaining lug.

Referring now more particularly to the drawings wherein like reference numerals refer to corresponding parts thoughout the various views 1 is what may be termed the main frame of the machine, the same being of any suitable design but conveniently of metallic formation and rectangular in shape, the said frame being supported on suitable legs or standards 2 connected by an interposed reinforcing casting 3, and mounted on anti-friction bearings 3ª, whereby the machine is portable and may be moved from place to place. Overhanging bracket arms 4 are mounted on the frame 1 there being conveniently two of said bracket arms at each end of the frame, one adjacent each side, and which said bracket arms are adapted to support the frame for the can feeding mechanism, in a manner to be presently described. An inlet runway or chute 5 of usual construction for the feeding of cans is mounted on the frame 1 at the forward end of the machine, in any desired manner, and a delivery runway 6 for the labeled cans is positioned at the rear end of the machine and mounted upon the frame 1 in any desired manner.

While the runway for the cans may be in the nature of a continuous supporting guide member or members extending from end to end of the machine, it is of advantage to form said runway in sections carried by various parts of the machine, and said sections of the runway will be referred to in treating of the parts themselves hereafter.

The means for feeding the cans to be labeled from end to end of the machine, and to and from the various pasting and labeling instrumentalities, is conveniently mounted on a suitable frame or support 7 comprising oppositely disposed bars extending longitudinally of the machine at a point above the can runway or support. Mounted at opposite ends of the frame member 7 are suitable brackets 8 and 8ª constituting bearings for the shafts 9 and 9ª respectively each carrying a plurality of driving pulleys 10 and 10ª respectively. The said pulleys are mounted so that they will assume a position adjacent opposite ends of the cans, and mounted upon the said pulleys which preferably have substantially V-shaped peripheries, as more clearly illustrated in Fig. 3, are driving belts 11, which latter are preferably round in cross section. The peculiar formation of driving belts has advantage over the usual flat surfaced belts in that a substantially line contact with the cans is afforded, with the result that while an effective drive is presented, the belt or belts are less likely to become smeared with paste, and any paste which might adhere to the belts will not smear or otherwise injure the labels to any appreciable extent. Secured to one of the belt pulley shafts, conveniently that one, 9, at the rear end of the machine is a drive wheel conveniently in the nature of a sprocket 12, adapted to be driven from the main driving mechanism to be referred to later on. Mounted upon that belt pulley shaft 9ª at the opposite end of the machine is a swinging arm 13 carrying at its end a feed disk 14 positioned above the can feed chute 5 and adapted to be driven from the shaft 9ª through the medium of a drive 15. The swinging arm with the feed disk 14 constitutes with the feed belts 11 a preferred means for automatically spacing the can as fed through the machine, which said spacing mechanism however constitutes no part of the present invention, but forms a part of a co-pending application, the joint invention of Leister and Schaffer, Serial No. 357,053, filed February 12, 1907.

The mechanism for applying paste to the can at the junction of the top and body of the can conveniently comprises the following parts: Projecting between the side members of the main frame 1 is a suitable supporting member 16 having an opening 17 extending therethrough for the reception of a longitudinally extending bar or rod 18, the latter being adapted to be adjusted longitudinally of the machine in said opening 17 and to be secured in adjusted position by a securing bolt or the like 19. At the opposite end of the bar 18 is a suitable coupling member having a sleeved portion 20 fitting over the terminal of the bar 18 and secured thereto as by a bolt 21. The coupling member also has a split collar 22 forming a vertically extending opening or bearing for the reception of a vertically extending rod 23, which latter may be adjusted vertically in the bearing 22 when the split wall of the latter be closed into binding contact with the rod 23 as by a securing bolt 24 engaging ears 24ª of the split collar whereby the vertically extending rod 23 is held in its adjusted positions. Mounted upon said vertically extending rod 23, which may be termed a supporting stem is a supporting member 25 secured to said stem as by a bolt 26, the supporting member 25 having adjacent opposite ends thereof on its upper surface elongated guides or runways 27 adapted to fit within coöperating grooves or guide ways 28 extending across the under surface of a paste pot or receptacle 29. Securing bolts 30 having adjusting wheels 31 at the ends thereof, pass through openings in the support 25 and are threaded at their inner ends to engage threaded apertures 32 in the paste receptacle 29, to thereby firmly hold the receptacle upon said support 25. The paste receptacle 29 may be substantially rectangular in shape, with the front side thereof extended and inclined as at 29ª for the convenience of the operator in supplying paste to the receptacle. Mounted within the receptacle 29 and extending longitudinally thereof, and longitudinally of the machine, is an elongated paste applying member, illustrated in the form of a roll 33, the same being positioned adjacent one edge of the receptacle, preferably the rear edge, or that edge away from the paste inlet end 29ª. Oppositely disposed can runways or guides 34 are secured to the paste receptacle in any desired manner, and are arranged to receive the fed cans from the supports or runways 35 extending between the can feed chute 5 and said runways 34. The pasting roll 33 may have a suitable covering of felt or the like 33ª as shown, and is adapted to be rotated preferably in the direction of the arrow, or toward the adjacent edge of the can. The pasting roll 33 is so arranged and positioned that its yielding periphery dips into the paste in the receptacle 29, and will contact with the periphery of the can fed along the runways 34 at a point overlying the junction of the can top and the can body, it being noted in this connection that the cans are fed into the machine with the applied tops facing the rear side of the machine, or rather that side of the paste receptacle in which the paste roll 33 is positioned, and the said roll is of such a length that by the time a can traverses the same, a coating of paste will be applied for a limited width entirely therearound. A scraper blade 36 of suitable construction extends longitudinally of the roll 33 adjacent the upper periphery and below the adjacent guide or runway 34, thereby regulating the quantity of paste taken up by the roll 33 and preventing splashing thereof on the runways 34 or other parts of the machine. Since the pasting roll 33 rotates in a direction transversely to the direction of feed of the cans, the cans will be more evenly and thoroughly pasted than would be the case should the roll rotate in the same direction as the feed, and this construction is of especial advantage in connection with the pasting of cans having previously applied tops or lids, since the paste will be applied by a sweeping action transversely of the movement of the cans, and toward the headed end of the cans, whereby the paste will find its way to and under the edge of the top, and thereby present a pasted surface at this point entirely around the can, and effecting an air tight or sealed joint.

It is customary to apply to the can as it is fed to the labeling receptacle a daub of paste of somewhat limited width extending substantially from end to end thereof, this for the purpose of permitting the can in its rolling movement to pick up and hold one end of the label as the can passes thereover and which label by the continued movement of the can will wind around the periphery thereof and be separated from the remaining labels on a pile positioned on the customary label support. In the preferred embodiment of the present invention—the means for applying the paste to the can on a longitudinal line, for picking up, in the rolling movement of the can, a label to be wound therearound is so associated with the sealing pasting member 33 just described, as to make it possible to utilize a common drive mechanism, and a common paste receptacle, and has the additional important advantage of permitting both paste members to be simultaneously adjusted with the paste receptacle upon its support, in a manner presently to be referred to. The pasting roll 33 conveniently has a journal or pintle 37 projecting through the front end of the receptacle 29 for connection with the driving mechanism, later described; and a journal or pintle 38 loosely mounted in a bearing 39 supported on the bottom of the receptacle 29 and spaced from the rear end of the receptacle. Mounted in the receptacle 29 in the space between the rear end of the roll 33 and the rear end of the receptacle 29 is a paste applying member in the form of a roll 40 conveniently having a felt or other yielding surface 40ª and extending transversely of the machine, and journaled in suitable bearings 41 at the sides of the receptacle 29. Runways 34ª at the rear end of the receptacle are arranged in line with the runways 34 and separated from the ends of the latter to provide an unobstructed space above the paste roll 40. The purpose of this roll 40 is to apply a daub or coating of paste extending longitudinally of the can, the guides or runways 34 and 34ª on the paste receptacle, permitting, as above noted the can in its feeding movement along the runways to contact with the yieldable tread of the roll 40 as the can passes the same. A suitable scraper blade 42 is mounted in the receptacle adjacent the forward edge of the roller 40 which rotates in the direction of the arrow, to thereby regulate the quantity of paste applied to the roller 40. It is thus seen that but a single receptacle is necessary to supply paste to both the longitudinally and transversely extending rolls, and the common drive mechanism for the rolls conveniently comprises a drive shaft 43, secured to the shaft of the paste roll 40 having at one end a drive wheel conveniently a worm gear 44 for connection with the main drive mechanism, later to be described, and also having intermediate its ends a bevel gear 45 arranged to mesh with a similar gear 46 mounted adjacent one end to a longitudinally extending shaft 47 which latter has adjacent its opposite end a gear wheel 48 arranged to mesh with a gear wheel 49 mounted on a stub shaft 49ª supported on the receptacle 29 in any desired manner and arranged to mesh in turn with a gear wheel 50 mounted on the projecting end of the shaft 37 of the paste roll 33. Suitable bracket supports 51 may be secured to the receptacle for supporting the shaft 47.

From the above it will be seen that as movement is imparted to what may be called the drive shaft 43 of the pasting rolls, the roll 40 will be rotated and through the medium of the gear connection 45—46, the shaft 47 will be rotated and in turn the gears 48—49 and 50 thereby imparting rotary movement to the longitudinally extending paste roll 33 in the direction of the arrow, (Fig. 8).

It is desirable to adjust the paste receptacle and the paste carrying rolls longitudinally of the machine and longitudinally of the label receptacle whereby the paste roll 33 will be accurately spaced from the label receptacle a sufficient distance to permit the can after receiving the longitudinally extending daub of paste to make a complete revolution prior to arriving at the label receptacle and to thereby bring the longitudinal paste line thereof in contact with the forward end of the label. To this end the paste receptacle with the parts carried thereby is adjustable longitudinally of the machine by simply loosening the bolt 19, and sliding the rod 18 relative to the support 16, and re-adjusting the bolt 19 to secure the parts in adjusted position. In this manner also the rolls may be adjusted to operate upon labels of different lengths. Should it be desired to adjust the paste carrying rolls vertically, or the runways mounted thereon, to accurately position the same in substantial alinement with the other sections of the runway throughout the machine, the said receptacle and the parts carried thereby may be readily adjusted up and down, by loosening the bolt 24 thereby expanding the split collar 22, when the supporting stem 23 may be moved to the desired position, and held in its changed position by re-adjusting the bolt 24, as will be obvious.

Each of the scraping members 42 and 36 for the rolls 40 and 33 have angled terminals overlapping the respective ends of the rolls, to thereby prevent the accumulation of paste upon the ends of the paste rolls. Arranged rearwardly of the paste receptacle 29 and below the feed belts 11 is a label holder or receptacle 52 and extending between said receptacle 52 and the paste receptacle 29 are suitable can supports or runway sections 53. The label receptacle 52 has associated therewith mechanism for automatically feeding the labels into position to be taken up by the cans as the same roll into contact therewith, which label feeding mechanism however constitutes no part of the present invention and may be of any of the approved types. The wall of the label receptacle 52 has a cut out portion at the top adjacent one end thereof, said cutout portion being indicated by the numeral 54, said cutout portion being adapted for the reception of—

*The paste applying mechanism for the lap-end of the labels.*—This mechanism includes means whereby the paste is taken up from a suitable receptacle by a suitable carrier, which latter is arranged to move within the cutout portion 54 of the label receptacle and to engage the exposed upper surface of the top label at the lap end or edge thereof, of said mechanism being so constructed and arranged that the same is adjustable, as well as bodily removable from the machine. In construction said mechanism is preferably made up as follows: Upon one side, conveniently the front side of the main frame 1 is a longitudinally extending raised portion 55 constituting a runway or guide upon which a carrying bar 56 having a guide groove 56ᵃ is slidably mounted. The frame 1 at the longitudinally raised portion 56 thereof has a slotted opening, and the adjustable support 56 has an aperture registering with said slotted opening, a shaft 58 being adapted to pass through said registered opening and slot and having at one end a cam surface disk member 59 adapted to engage the inner surface of the frame, and said shaft having at its opposite end a head or nut 60 adapted to engage the outer surface of the slidable support 56. Connecting with said head 60 is an operating handle 61 adapted to impart rotary movement to the shaft and in turn the cam 59 to thereby lock or release the support 56, according to the direction of movement of the operating handle 61. In this way the supporting member 56 may be adjusted longitudinally relative to the frame 1, and thereby change the position of the pasting mechanism mounted upon said support 56. The support 56 has a horizontally extending rest or support 62 connected thereto, adapted for the reception of a suitable paste receptacle 63. The support 62 has upon its upper surface guides 62ᵃ constituting a guideway for the reception of a shoe or guide 63ᵃ projecting downwardly from the under surface of the receptacle 63, the said shoe and guideway extending transversely relative to the machine.

64 is a shaft having a threaded terminal adapted to engage a threaded recess in the base of the receptacle 63, the said shaft having at its outer end an operating hand wheel 65. A collar 65ᵃ fixed to the shaft 64 engages an extension 65ᵇ on the support or bed 62, when the shaft has been turned to locking position. Should it be desired to release the receptacle 63 from the support 62, the hand wheel 65 is turned until released from its threaded engagement of the receptacle 63 when the receptacle 63 may be slid along the guide until released therefrom.

In order to prevent the shaft 64 from becoming separated from the support 62, the construction of said shaft 64, is the same as the construction of the shafts 30 before described, that is the threaded ends thereof are enlarged, the enlarged portions adapted when released from the paste receptacle to engage within enlarged recesses in the supports for the receptacle as is apparent. An upright bracket 66 is mounted upon the inner side of the paste receptacle 63, the bracket having an offset upper end 67 with side flanges 67ᵃ constituting a guideway for an elongated arm 68 adapted to project substantially from side to side of the machine at a point below the runways 69 formed by the sides of the label receptacle 52, the said arm fitting within the cut out portion 54 of the label receptacle previously referred to. Mounted in the paste receptacle for rotary movement is a shaft 69′ one end of which projects without the receptacle and has secured thereto a gear wheel 70 arranged to mesh with a pinion 71 having a bearing in a suitable bracket 72 secured to one end of said receptacle 63. A suitable guard 73 overlies said gear and sprocket 70 and 71 respectively, as shown, and the shaft 74 for the sprocket projects beyond the bracket, for connection with the main drive mechanism to be hereinafter described. The shaft 69′ has keyed thereto for rotary movement therewith a sprocket wheel 75, around which passes an endless belt 76 having reinforced eyelets 77 for engaging the sprocket. Mounted adjacent the outer end of the arm 68, conveniently upon a downwardly projecting supporting block 78 secured to the under surface of the arm 68 is a pulley 79 around which the belt passes, and also secured to said supporting block 78 is a pulley 80 over which passes both stretches or reaches of the belt 76. Mounted for rotary movement upon an upwardly projecting bracket 81 upon the paste receptacle 63 is a pulley 82 over which both stretches of the belt passes, the periphery of the last mentioned roll or pulley 82 at the top being in substantial alinement with the periphery of the pulleys 79 and 80 at their top, as clearly shown in Figs. 11 and 12. A plate 83 is secured to the top of the receptacle 63 at a point overlying the drive wheel and sprocket 75, the plate having an opening 83ᵃ for the passage of the belt 76. A yieldable member 84, conveniently U-shaped in form rests on the plate 83, the arms thereof overlying the wall of the opening 83ᵃ, and preventing contact of the belt with the adjacent walls of said plate 83. This yieldable member 84 also constitutes a yieldable wiper for the sides of the belt, and the same is held in position conveniently by a U-shaped plate 85 which latter has downwardly projecting portions 86 overlying the sides of the wheel 75, and constituting an effective scraper for said wheel 75. Overlying the wall of the opening 83ᵃ at the outer end thereof is a yieldable member 87 held in place by a plate 88 having a pin and slot connection 89 with the plate 83, whereby the yieldable member 87 may be adjusted back and forth relative to the surface of the belt 76 to regulate the quantity of paste and evenly distribute the same on said belt. The yieldable members 84 and 87, which are conveniently of felt constitute a yieldable engaging surface substantially entirely around the upper stretch of the paste belt 77. The pulleys 79 and 80 have guide flanges for overlying the edges of the belt 76, and said pulleys have peripheral grooves 90 as clearly illustrated in Fig. 14, the grooves serving to accumulate paste from the belt 76 whereby to supply such portions of the belt 76 as may be devoid of paste, with paste as the belt passes over the roller. Mounted upon the paste carrying belt 76 is a paste guard the same comprising a member 91 having side flanges 91ª adapted to overlie the edges of the belt 76, and said member also having oppositely disposed arms or retaining flanges 92 and 92ª arranged to engage the outer surface of the upper and lower stretches of the belt, whereby the member 91 is slidably connected to said belt. It will be observed that the retaining flanges 92 and 92ª are disposed at that edge of the belt away from the ends of the labels to be supplied with paste, whereby the flange 92, will not scrape that edge of the belt 76 which is designed to engage the end of the labels. The member 91 has a recess 93 for the accumulation of paste, for the purpose specified with regard to the recesses 90 above described, and the supporting part of the member 91 for the belt 76 between the flanges 91ª is preferably inclined as illustrated in Fig. 15 whereby to tend to slightly tilt downwardly that edge of the belt which engages the ends of the labels. The member 91 is adapted to overlie the uppermost label of the pile, and the same may be slid along the belt 76 until it assumes this position, a downwardly projecting portion 94 being adapted to engage the edges of the labels, and it will be observed that the member 91 with the associated parts constitutes in effect a housing for the belt at the edge of the labels and in this way precludes the possibility of the belt contacting with the top of the labels and besmearing the edges of the labels with paste.

The supporting arm 68 is provided with a slot 95 extending longitudinally thereof and registering with an aperture in the seat 67, the thumb bolt 94 passing through said slot 95 and engaging the aperture, the thumb bolt and aperture conveniently having complementary threads, whereby the bolt may be tightened or loosened for the purpose of retaining the arm 68 in adjusted positions, as is obvious.

The label receptacle 52 is open at its top as is customary, and the opposite walls thereof are inclined as at 96, which inclined walls 96 together with the connecting straight portions 97 of the side walls of the label receptacle constitute a section of the run way for the cans. The labels within the receptacle normally occupy a position whereby the forward end of the uppermost label will assume a position preferably slightly above the lowermost end of the inclined portion of the receptacle whereby the can in traveling up and over the inclined portion will engage the exposed edge or end of the label and carry the latter with it.

The continued movement of the can over the run way section provided by the edge 97 of the label receptacle will wind the label about the can, the lap end of said label having previously been supplied with paste through the medium of the cross endless paste carrier 76. Upon reaching the end of the straight edges 97 of the label receptacle walls the can engages suitable runway sections 98, which latter overlie the cutout portion 54 of the label receptacle as more clearly shown in Figs. 1 and 2, and upon reaching this point, the can with the label which is being wound thereabout, is in position to be acted upon by the pressing or ironing mechanism which is adapted to thoroughly press and iron the label about the can whereby the same will present a smooth surface and one devoid of wrinkles, etc.—This mechanism includes a suitable support 99 secured to the frame work of the machine in any desired manner, and upon which support is mounted the runway 98 and a yieldable pad 100, which latter connects with the runway 98 and constitutes a continuation of the runway. The yieldable pad is conveniently made up of a plurality of layers of felt or other fabric and preferably extends from side to side of the machine. Arranged above said pad 100 and said runway 98 is a presser member adapted to firmly press the cans against said runway and pad as said cans are being fed past the same. The said presser member is conveniently arranged between the feed belts 11, and is designed to relieve the strain of the feed belts incident to the pressing of the labels upon the cans, and to provide an extended surface for engaging the cans intermediate the feeding belts 11 which as has previously been described, are conveniently round in cross section thereby affording a relatively narrow or line point of contact with the cans adjacent opposite ends. The preferred form of presser member is indicated in the drawings by the numeral 101 and is in the form of a relatively wide endless belt mounted at one end upon a pulley 102 secured to the belt feed shaft 9, and at its opposite end upon a pulley 103 rotatably mounted upon a shaft 104 secured to the feed belt frame 7 in any desired manner. In order to retain said belt 101 in forcible contact with the cans, while at the same time permitting the same to yield as occasion demands, yieldable presser rollers 105 are provided intermediate the ends of the belt, and adapted to exert downward pressure on the labeled can. Said rollers are conveniently of the same length as the width of the belt, so as to give equal pressure and are mounted upon shafts 106 loosely mounted for rotary movement in journal boxes 107 slidably mounted in guide ways 108 secured to the sides of the frame 7. Suitable springs 109 in said guide ways 108 engage the top of said journal boxes to press downwardly the shaft 106 and the roller 105 carried thereby, any desired means being provided to limit the downward movement of said shafts. A combined guide and belt tightener is mounted on the frame 7 the same comprising a rim or flanged roller 110 arranged above the presser belt adjacent the pulley 103 at the end of the belt, the rims or flanges of the member 110 overlying the sides of the belt 101 thereby retaining the latter in position on each of the rollers 102 and 103. The roller 110 is mounted on a shaft 111 loosely sleeved in rock arms 112 conveniently terminating in a disk member 113 arranged to rest flat against a substantially similar disk member 114 of a bracket 115 secured to the frame 7. Passing through said disk members is a suitable bolt headed at its inner end 116 and threaded at its outer end 117, and a thumb nut or the like 118 engaging said thread is designed to force said disk members into holding contact. Should it be desired to adjust the tension of the presser member 101, it is only necessary to loosen the thumb nut 118, when the rock shaft 111 may be moved about the pivot formed about the bolt until the desired position is assumed when the thumb nuts 118 will again be adjusted into folding position. In this way the yieldable pressure of the belt 101 may be regulated and the play of the belt 101 taken up as desired.

The feed belts 11 arranged at opposite sides of the belt 101 are also supported intermediate their ends by somewhat similar yieldable presser rollers 119. The said feed belts also are provided with means for taking up the play therein, the means being indicated generally by the numeral 120 which latter is preferably of the same construction as the pulley 110 and associated parts heretofore described with reference to the regulating of the presser belt 101, the belt tightener 120 being supported upon the frame 7 and conveniently engaging the upper stretches of the belts 11 adjacent the forward end of the machine, as clearly illustrated in Fig. 2.

The machine is preferably power driven, and the driving mechanism for the various parts of the apparatus may be described as follows: Secured to the main frame 1 in any desired and convenient manner as by supporting brackets 121 is a motor, conveniently electric 122 which latter has projecting therefrom a power or drive shaft 123 with a pinion 124. An elongated rock arm 125 has at one side adjacent its lower end an offset part 126 terminating in a sleeve mounted on the drive shaft 123, and at its opposite side an auxiliary sleeve 127 adapted to support a rotatable shaft 128 having at one end a gear wheel 129 arranged to mesh with the said pinion 124. The rock arm 125 has at its upper end a cross piece 130, conveniently segmental in design and having a segmental slot or recess therein; a bolt 132 passes through the slot and engages an aperture in the frame 1, the bolt having a headed end engaging the inner surface of the frame 1, and a nut 133 threaded at its outer end to a washer 134 interposed between the said nut and the segmental part 130 of the rock arm. The said nut is adapted to hold the arm in adjusted rocking positions about the pivot or center of the rock shaft 123, and in this connection it will be noted that regardless of the adjusted position assumed by the rock arm, the gear wheel 129 will remain in mesh with the drive pinion 123 thereby maintaining a uniform driving connection therebetween. Also mounted upon the shaft 128 is a sprocket 135 adapted for driving an endless drive chain 136 mounted upon the sprocket 135 and the sprocket 12 secured to the can feed drive shaft 9 previously described. It is seen that by loosening the nut 133, the rock arm 125 with associated parts may be swung about the pivoted point 123 thereby either raising or lowering the driving mechanism for the chain 136 thereby permitting the raising or lowering of the can feed mechanism, to adapt the machine to cans of various sizes. By the movement of the shaft 9 through the medium of the sprocket 12, the feed belts are rotated, as also the presser belt 101, that wheel 102 for supporting one end of the belt 101 being secured to the shaft 9 as previously described, and which said wheel 102 may therefore be termed the drive wheel for the presser belt 101. Secured to the shaft 9ª at the opposite end of the machine, which said shaft receives its movement through the medium of the feed belts 11 is a bevel pinion 137 arranged to mesh with a similar pinion 138 mounted upon a vertically extending shaft 139 supported at one end in a bearing 140 and carried by an overhanging arm 141 on the frame 7. The pinion 138 is secured in position on the shaft 139 as by a bolt 142. The shaft 139 may have additional bearing intermediate its ends as shown at 143, as well as an additional bracket 144 at its lower end. The shaft 139, is will be noted, is adapted to have sliding engagement in the bracket 144 whereby the shaft may be adjusted vertically with the can feed mechanism previously described. Secured to the shaft 139 as by a bolt 145 is a bevel pinion 146 adapted to mesh with a similar pinion 147 carried upon a shaft 148, which latter is suitably supported in bearings 149 secured to the frame of the machine in any desired manner. Secured to the shaft 148 is a worm pinion 150 arranged to mesh with the worm gear 44 mounted upon the rotary shaft 43 having bearing in the paste receptacle 29 previously described. The worm 150 is conveniently lengthwise adjustable on the shaft in any desired manner and held in position conveniently by a bolt 148ª whereby it will permit of the adjustment of the paste receptacle 29, and maintain uniform drive between the worm gear 44 and pinion 150 mounted upon said shaft 148. The shaft 148 has pivotally connected thereto at 149 a member 150 conveniently tubular at one end and adapted for the reception of a rod 151 slidably mounted therein through the medium of the pin and slot connection 152, the rod 151 having secured thereto a head 152' pivoted to a coupling member 153 as at 154, the latter having in opposite portions of its wall curved slots 155 adapted for the reception of a pin 156 mounted upon the stub shaft 74 which carries the gear wheel 71 through the medium of which the paste carrying belt 76 is driven.

That portion of the driving mechanism just described, provides a lengthwise adjustable driving mechanism for the lap end pasting belt 77, said adjustment being possible by reason of the pin and slot engagement 152, with the result that the paste carrying mechanism for the lap end of the label may be adjusted longitudinally of the machine through the medium of its support 56 which, as has been seen is slidably mounted upon the guide way 55 secured to the frame 7. Again the particular drive mechanism makes it possible to quickly detach the paste receptacle and the paste carrying mechanism for the lap end of the label since the coupling member 153 permits of the main section of the driving mechanism to be detached from the stub shaft 74, which latter is carried by the paste receptacle through the medium of the bracket 72. It is noted that the coupling member 153 when turned to the position illustrated in Fig. 6, when the pin 156 engages the rear end of the slots 155 will lock the parts together, and on the other hand to release the parts it is only necessary to slide the rod 151 inwardly in the recess formed by the tubular member 150, when the tilting movement of the coupling member 153 will permit the pin 156 to move out of holding engagement with the slots 155 as is apparent. When the coupling member is separated the drive mechanism including the parts 150, 151 and coupling member 153 may be held out of the way for the detachment of the paste receptacle 63, by the retaining lug 157, the parts being shown in this position in dotted lines in Fig. 6.

For many reasons, which are apparent to those skilled in the art to which the present invention relates it is desirable at times to reverse the driving mechanism, whereby the movement of the cans may be reversed, to return the same to or toward the feed chute 5, and to this end the invention includes a driving mechanism designed to feed the various instrumentalities including the several pasting members, can feed belts, etc., from a common motor, when the drive wheel of the latter is moved in one direction, while should the movement of said drive be reversed, the can feeding mechanism only is operated to reverse the movement of the cans, the remaining parts of the drive remaining stationary whereby the several pasting mechanisms will assume a position of rest.

With the above object in view, as has been seen the various drive mechanisms for the pasting members receive their source of power from the shaft 9ª for the rear end pulley support for the feed belt 11. Interposed between said shaft 9ª and the bevel pinion 137 which latter is designed to impart movement to the pinion 138 the shaft 139, as previously explained, is a releasable locking member, the same conveniently comprising a dog 158 slidably mounted in a tubular extension 159 threaded to a sleeve 137ª integral with the pinion 137, a spring 160 being interposed between the closed end of the tubular member 159 and the rear end of the locking member 158 which may be termed a locking dog. The locking dog 158 has an inclined end 161 arranged to engage within a complementary inclined notch or slot 162ª in the periphery of the shaft 9. The inclined portion of the recess 162ª connects with a straight wall adapted for engagement with the side wall of the locking dog 158, whereby upon movement of the shaft 9ª in the direction of the arrow indicated in Fig. 16 and sleeve 137ª with the pinion 137 will be locked for movement with the shaft 9, whereas should movement to the shaft 9ª be reversed, the inclined portion of the recess 162ª will ride over the inclined portion of the dog 158, the latter giving under the action of the spring 160 and moving out of the path of the shaft 9ª. It is therefore seen that in this reverse movement of the shaft 9ª, which permits of the return of the cans through the medium of the drive belts 11, the pinion 137 and the associated drive mechanism will remain stationary.

The guide mechanism for engaging the ends of the cans is conveniently made up as follows: Oppositely disposed guide rails for the ends of the cans are positioned above the run way formed by the parts previously described and adjacent to said run way. One of the guide rails 162 is conveniently of rigid material and supported in any desired manner as by bolts 163 to bracket supports 164 mounted upon the frame work of the machine. It is obvious that this rail may be adjustable, though the same need not necessarily be made so, but at least one of the guide rails is adjustable, as clearly shown in the drawing at 165. This rail like the rail 162 conveniently extends from end to end of the run way and to positions adjacent the feed and delivery chutes 5 and 6 respectively. The rail 165 is of a construction to permit of the same to yield at every point of the run way, and to this end is formed of a material which is yieldable or flexible, shown for the purpose of illustration as being formed of sheet metal, preferably spring steel. This construction of rail not only provides a highly flexible guide for the ends of the cans which will itself give to accommodate itself to the cans, but also provides a rail which is continuous and nonsectional and which has a smooth flat bearing surface for the cans from end to end of the machine. The rail 165 is suitably supported upon rods 166 slidably mounted in transverse aperature in an elongated support 167 extending longitudinally of the machine and secured to the frame work in any desired manner as by brackets 168. Mounted upon the rods 166 and interposed between the rail 165 and said support 166 are suitable spiral springs 169 whereby to exert limited inward pressure to the flexible rails. From this construction it will be seen that while the spring supports for the rail 165 maintain an engagement of the rail with the end of the cans, at the same time the rail may yield upon itself and at points between the various springs 169, or in fact at any point of the run way.

The operation of the machine as a whole may be briefly referred to as follows: The feeding mechanism for the cans being mounted for vertical adjustment, as previously described, the carrying frame 7 for said feeding mechanism is so positioned with respect to the runway formed of the parts before mentioned, as to bring the feed belts 11 into contact with the periphery of the cans when placed upon the run way. When so positioned, the frame 7 is held stationary by suitable nuts 170 threaded to bolts 171 secured in any desired manner to the frame 7 and projecting laterally therefrom for sliding engagement with vertically extending slots 172 in the case of the bracket supports 4 secured to the main frame $l$. Washers 173 may be interposed between the nuts 170 and the wall surrounding the slotted portion 172 of said brackets 4. The frame 7 with the parts carried thereby will thus be firmly supported in adjusted positions, and the presser member 101 is simultaneously adjusted with the feed belts 11. Motion is now imparted to the feed belts 11 through the medium of the motor 122 and the interposed drive therebetween and the feed drive shaft 9, it being noted in this connection that when the frame 7 is adjusted vertically, in either direction, the drive mechanism for the belts 11 will remain uniform, it being only necessary to loosen the nut 133 when the rock arm 125 may swing about the pivot 123 to raise or lower the gear wheel 129, while the latter at the same time maintains meshing engagement with the pinion drive 124. When the driving mechanism for the sprocket chain 136 has been adjusted in accordance with the vertical adjustment of the feed carrying frame 7 the nut 133 is readjusted to holding position. Through the movement of the feed belts 11 the shaft $9^a$ at the front of the machine is operated which shaft through the medium of the intermeshing pinions 137 and 138 imparts rotary movement to the shaft 139 having drive connection, as before explained with what has been termed the sealing paste roller 33 and the transversely extending paste roller 40 adapted for applying a daub of paste longitudinally of the can. The shaft 148 which through the medium of the gear connection with the vertically extending shaft 139 imparts movement to the pasting rolls just mentioned is coupled up with a sectional and flexible shaft adapted to impart movement to the cross belt 76 for applying paste to the lap end of the label. The cans to be labeled are fed upon the inclined feed chute 5 into contact with the spacing roll 14 which receives its movement from the shaft $9^a$ rotated by the feed belt 11. After leaving the roll 14 the cans engage the run way 35 and by the peripheral contact of the feed belts 11, which move at a greater speed than the roll 14, the cans are spaced automatically from succeeding cans. The belts 11 convey the cans to and from sections of the run way mounted upon the paste receptacle 29, and in this movement the headed ends of the cans move into contact with the longitudinally extending rotatable paste applying roll 33, it being noted in this connection that the cans are positioned so that their heads are disposed toward that side of the receptacle 29 containing the roll 33, and the roll will engage the cans at the junctions between the can body and the flange of the can tops or lid. The roll 33 is of a length to apply, during the rotation of the can a body of the paste of limited width entirely around the can where the flange of the can top joins the body of the can. Since the roll 33 moves in the direction of the arrow, the paste will be applied by a sweeping movement toward the headed end of the can and the yieldable tread of the roller 33 will force the paste to and under the edge of the flange of the can top and the adjacent surface of the can body and top in a very effective and thorough manner. Upon reaching the end of the paste receptacle 29 the can engages the transversely extending roll 40 and receives a line or daub of paste extending longitudinally thereof for the purpose of taking up the uppermost label in the label support 52.

The paste receptacle is so arranged with respect to the label receptacle 52, that the can may make a complete revolution before leaving the paste roll 40 whereby to bring the pasted line thereof into contact with the end of the label in the support 52. The continued movement of the can imparted by the feed belts 11 brings the can along the runway provided by the upper edge 97 of the label receptacle 52, and the uppermost label which engages the longitudinal line of paste on the can is wound about the can, said label having previously been supplied with paste at its lap end by the cross belt 76 positioned above said labels at the rear end of the same and below the runway. The continued movement of the can brings its labeled surface upon the runway 98 and yieldable support 100 and below the pressing belt 101. The presser member 101 exerts considerable pressure upon the can and tends to thoroughly press or iron the label about the can whereby to present a smooth and unwrinkled surface. Upon leaving the feeding belts 11 the cans with the applied and affixed labels are delivered to the delivery runway 6 for removal. The labels when affixed are secured entirely around the can by paste at the junction between the flange of the can top and the body of the can with the result that an air tight receptacle is provided by the label. In order to position the label receptacle containing the pasting rolls 33 and 40 in proper position so as to aline the run way sections carried by said receptacle with the remaining sections, or for any other reason for which vertical adjustment is desired, it is simply necessary to loosen the split collar 24ᵃ by adjusting the nut 24, when the vertical supporting stem 23 of the receptacle may be moved either up or down. On the other hand should it be desired to adjust the said receptacle 29 longitudinally, in order to properly position the transverse roll 40 with respect to the label receptacle 52 or for other cause, it is only necessary to loosen the bolt 19, when the supporting rod 18 may be moved back and forth upon its support 16. Again should it be desired to adjust the lap end pasting belt so as to adapt the latter to labels of different sizes or other cause, and to bring the belt in position where it will engage the end of the label, the operator imparts rotary movement to the handle 61, thereby loosening the support 55 for the pasting receptacle 63 and pasting member 76 carried thereby, when these parts may be adjusted longitudinally of the machine. Further should it be desired to remove either the paste receptacle 29, or the paste receptacle 63, with the parts carried thereby, it is only necessary to loosen the retaining bolts 31 and 65 for the respective receptacles when they both may be removed by a sliding movement from the side of the machine.

In the claims wherein the term "can" is employed as referring to the article to be labeled it is to be understood that this term is to be construed as covering as well a box or other package upon which it is desired to place a label, the machine being susceptible of use upon articles of a variety of types.

What I claim is:

1. In a labeling machine, the combination of labeling instrumentalities, of means for applying a narrow strip of paste entirely around the can, a can runway or support, means for feeding the cans along the runway into operative relation with respect to the instrumentalities, said means including a plurality of conveyer belts arranged upon opposite sides of the center of the runway, said belts being round in cross section, and an adjustable frame for supporting said belts whereby they may be adjusted vertically with respect to said runway.

2. In a labeling machine, the combination of a runway, labeling and pasting means adjacent the runway, a main support for the runway and said means, conveyer means above the runway, an auxiliary support for the conveyer means positioned upon and adjustable relative to said main support, and a motor supported upon the main support having an adjustable drive connection with the conveyer means, whereby the latter may be adjusted at will to accommodate different sized receptacles and remain in operative drive connection with the motor.

3. In a labeling machine, the combination of pasting and labeling instrumentalities, a runway for cans or the like, a conveyer belt for feeding the cans along the runway, and a relatively wide presser belt also above the runway and to one side of the conveyer belt, for ironing the labeled cans, a common vertically adjustable carrier frame for said belts, and means whereby the tension of said belts may be independently regulated.

4. In a labeling machine, the combination of labeling instrumentalities, a runway for cans or the like, a presser pad adjacent the rear end of the runway oppositely disposed conveyer belts arranged upon opposite sides of the center of the runway and substantially co-extensive therewith for engaging the cans, a relatively wide movable presser or ironing member arranged above the pad and between said belts, and a common support for the conveyer belts and movable presser member.

5. In a labeling machine, the combination of labeling instrumentalities, a runway for cans or the like, oppositely disposed conveyer belts arranged upon opposite sides of the center of the runway and substantially co-extensive therewith for engaging the cans adjacent opposite ends thereof, a relatively wide movable presser or ironing member arranged above the runway and between said belts adjacent the rear end thereof, a supporting frame for said belts and presser member, and means for adjusting the frame vertically relative to the runway.

6. In a labeling machine, the combination of pasting and labeling instrumentalities, a runway or support for cans or the like, a presser pad adjacent one end of the runway, oppositely disposed feed belts round in cross section arranged above the runway, and a relatively wide pressing belt arranged above the presser pad between said feed belts adjacent the rear end thereof.

7. In a labeling machine, the combination of pasting and labeling instrumentalities, a runway or support for cans or the like, oppositely disposed feed belts round in cross section arranged above the runway, and a relatively wide pressing belt arranged between said feed belts adjacent the rear end thereof, a common supporting frame for said feed belts and pressing member, and means for adjusting the frame vertically relative to the runway.

8. In a labeling machine, the combination of pasting and labeling instrumentalities, a runway or support for cans or the like, oppositely disposed feed belts round in cross section arranged above the runway, and a relatively wide pressing belt arranged between said feed belts, a common supporting frame for said feed belts and pressing member, and means whereby said frame may be adjusted vertically including bracket arms mounted upon a stationary part of the machine adjacent opposite ends of said frame and an adjustable connection between said bracket arms and the belt carrying frame.

9. In a labeling machine, the combination of pasting and labeling instrumentalities, a runway or support for cans or the like, oppositely disposed feed belts round in cross section arranged above the runway, and a relatively wide pressing belt arranged between said feed belts, a common supporting frame for said feed belts and pressing member, and means whereby said frame may be adjusted vertically including bracket arms mounted upon a stationary part of the machine adjacent opposite ends of said frame and an adjustable connection between said bracket arms and the belt carrying frame, said connection comprising a pin and slot connection between said bracket arms and said belt carrying frame.

10. In a can labeling machine, the combination of a main frame, a can runway, pasting mechanism, a label support, an auxiliary frame positioned on the main frame, shafts adjacent opposite ends of the auxiliary frame, pulleys on the shafts, conveyer belts positioned on said pulleys so as to engage one adjacent each end of the can positioned on the runway, an auxiliary pulley positioned on the shaft at the rear end of the machine at a point intermediate the first mentioned pulleys, and a relatively wide presser belt positioned on the auxiliary pulley and driven by its shaft, and a supporting pulley for the opposite end of the belt.

11. In a can labeling machine, the combination of a main frame, a can runway, pasting mechanism, a label support, an auxiliary frame positioned on the main frame, shafts adjacent opposite ends of the auxiliary frame, pulleys on the shafts, conveyer belts positioned on said pulleys so as to engage one adjacent each end of the can positioned on the runway, a relatively wide yieldable presser member extending longitudinally of the auxiliary frame intermediate said belts adjacent the rear end thereof, means for holding the conveyer belts in contact with the cans, and auxiliary means for yieldably forcing the presser belt into contact with the labeled cans.

12. In a labeling machine, the combination of pasting and labeling instrumentalities, a runway or support for cans or the like, a main frame, an auxiliary frame supported on the main frame above the runway oppositely disposed conveyer belts supported on the auxiliary frame, a relatively wide presser belt also supported on the auxiliary frame and arranged between the conveyer belts, pulleys upon which the belts are mounted and independent yieldable supports intermediate the ends of the belt.

13. In a labeling machine, the combination of pasting and labeling instrumentalities, a runway or support for cans or the like, a main frame, an auxiliary frame supported on the main frame above the runway oppositely disposed conveyer belts supported on the auxiliary frame, a relatively wide presser belt also supported on the auxiliary frame and arranged between the conveyer belts, pulleys upon which the belts are mounted, yieldable supports intermediate the ends of the belt, and belt tightening means carried by said auxiliary frame for the respective belts.

14. In a labeling machine, labeling instrumentalities, a runway or support for cans or the like, and means to produce a pasted surface of limited width entirely around a can at the junction of the flange or the lid with the can body comprising a paste member movable so as to apply paste to the can in a direction transversely of the direction of feed of the can.

15. In a labeling machine, labeling instrumentalities, a runway or support for cans or the like, and means to produce a pasted surface of limited width entirely around a can at the junction of the flange of the lid with the can body comprising a rotary paste member rotatable on an axis extending longitudinally of the direction of feed of the can.

16. In a labeling machine, labeling instrumentalities, a runway or support for cans or the like, and means to produce a pasted surface of limited width entirely around a can at the junction of the flange of the lid with the can body comprising an elongated pasting roll extending longitudinally of the machine.

17. In a labeling machine, labeling instrumentalities, a runway or support for cans or the like, and means to produce a pasted surface of limited width entirely around a can at the junction of the flange of the lid with the can body comprising a pasting member rotatable in a direction toward the headed ends of the can.

18. In a labeling machine, labeling instrumentalities, a runway or support for cans or the like, and means to produce a pasted surface of limited width entirely around the can at the junction of the flange of the lid with the can body comprising an elongated rotatable member extending longitudinally of the machine.

19. In a labeling machine, labeling instrumentalities, a runway or support for cans or the like, and means to produce a pasted surface of limited width entirely around the can at the junction of the flange of the lid with the can body comprising an elongated member extending longitudinally of the machine and movable in a direction toward the headed end of the can.

20. In a labeling machine, the combination of a can support or runway, conveyer belts movable above the runway and extending longitudinally of the machine for rolling the cans upon the runway, a label support, and means for applying paste to the can comprising an elongated member rotatable about an axis extending longitudinally of the runway.

21. In a labeling machine, labeling instrumentalities, a can support, and means for applying paste to the can comprising an elongated member having an axis extending longitudinally of the machine and adapted to apply paste in a direction toward the end of the can.

22. In a labeling machine, labeling instrumentalities, a can support, and means for applying paste to the can comprising a member rotatable about an axis extending longitudinally of the runway.

23. In a labeling machine, labeling instrumentalities, a can support, and means for applying paste to a can comprising a member rotatable about an axis extending longitudinally of the runway, said rotary member being of a length to apply a coating of paste entirely around the can.

24. In a labeling machine, labeling instrumentalities, a can support, and means for applying paste to the can comprising a member rotatable about an axis extending longitudinally of the machine and in a direction toward the headed end of the can, said rotary member being of a length to apply a coating of paste entirely around the can at the junction between the can top and body.

25. In a labeling machine, labeling instrumentalities, a runway or support for cans or the like, and means to produce a pasted surface of limited width entirely around the can at the junction of the flange of the lid with the can body comprising a yieldably surfaced pasting member movable so as to apply paste in a direction transversely of the direction of feed of the can.

26. In a labeling machine, labeling instrumentalities, a runway or support for cans or the like, and means to produce a pasted surface of limited width entirely around the can at the junction of the flange of the lid with the can body comprising a rotatable pasting roll extending longitudinally of the runway, said pasting roll having a yieldable tread, and being of a length to apply paste entirely around the can as the latter traverses the same.

27. In a labeling machine, labeling instrumentalities, a can support, and means for applying paste to the can comprising an elongated member extending longitudinally of the machine and movable so as to apply paste to the can in a direction transversely to the direction of movement of the can, and an adjustably mounted paste receptacle for supporting said member.

28. In a labeling machine, the combination of labeling instrumentalities, a runway or support, means for rolling the cans to be labeled along the runway and a pasting roll adapted to engage the cans as they roll along the runway, said pasting roll being mounted on an axis extending longitudinally of the runway.

29. In a labeling machine, a supporting frame appliances to produce a pasted surface of limited width entirely around a can at the junction of the flange of the lid with the body, combined with devices to apply and affix a label to the can, and cause the same to adhere to the said pasted surface, whereby a practically air-tight joint is formed, and means for adjusting said pasting appliances longitudinally of the machine, comprising an elongated member extending longitudinally of the machine adjustably connected to said supporting frame and having a supporting connection with the pasting appliances.

30. In a labeling machine, appliances to produce a pasted surface of limited width entirely around the can at the junction of the flange of the lid with the body combined with a labeling receptacle, means for applying paste to a different portion of the can, means for feeding the pasted can into contact with a label and affixing the label thereto, whereby a practically air-tight joint between the top and body of the can is formed, and a common support for said pasting mechanisms, said support being adjustable longitudinally of the machine.

31. In a labeling machine, appliances to produce a pasted surface of limited width entirely around the can at the junction of the flange of the lid with the body combined with a labeling receptacle, means for feeding the pasted can into contact with a label and affixing the label thereto, whereby a practically air tight joint between the top and body of the can is formed, a paste receptacle upon which the pasting appliances are mounted, and means whereby said receptacle with the said appliances may be adjusted both vertically and longitudinally.

32. In a labeling machine, labeling instrumentalities, a can support, and means for applying paste to the can comprising an elongated member extending longitudinally of the machine and movable so as to apply paste to the can in a direction transversely to the direction of travel of the can, and a vertically adjustable support for said pasting member.

33. In a labeling machine, labeling instrumentalities, a can support, and means for applying paste to the can comprising an elongated rotatable member extending longitudinally of the machine, and a longitudinal adjustable support for said pasting member.

34. In a labeling machine, labeling instrumentalities, a can support, and means for applying paste to the can comprising an elongated rotatable member extending longitudinally of the machine, a paste receptacle for said member upon which the latter is mounted and means for adjusting the latter longitudinally.

35. In a labeling machine, labeling instrumentalities, a can support, and means for applying paste to the can comprising an elongated rotatable member extending longitudinally of the machine, a paste receptacle for the pasting member and upon which the latter is mounted and means for adjusting the pasting receptacle vertically and longitudinally relative to the can support.

36. In a labeling machine, labeling instrumentalities, a can support, means for applying paste to the can comprising an elongated member extending longitudinally of the machine and movable in a direction so as to apply paste transversely to the direction of feed of the can, and a detachably mounted paste receptacle for supporting said pasting member.

37. In a labeling machine, labeling instrumentalities, a can support, and means for applying paste to the can comprising an elongated rotatable member extending longitudinally of the machine, and the removable pasting receptacle adapted to support said pasting member.

38. In a labeling machine, labeling instrumentalities, a can support, means for applying paste to the can comprising an elongated member extending longitudinally of the machine and movable transversely, and a paste receptacle for supporting said member mounted upon a guide way extending transversely of the machine whereby the receptacle with the paste member may be removed by a transverse sliding movement from one side of the machine.

39. In a labeling machine, a runway for cans or the like, feeding mechanism for the cans, a label support, a pasting member, a paste receptacle, and a support for the latter, the paste receptacle having a slidable interlocking engagement with said support, and means for retaining the receptacle from movement on the support.

40. In a labeling machine, a runway for cans or the like, feeding mechanism for the cans, a label support, a pasting member, a paste receptacle, and a support for the latter, the pasting receptacle being slidably mounted upon said support, means for retaining the receptacle from movement on the support, and means for adjusting said support vertically and horizontally.

41. In a labeling machine, main can runway sections, labeling instrumentalities, feeding mechanism for the cans, a paste receptacle arranged intermediate the ends of the main runway, a paste applying roll journaled in the receptacle, can runway sections mounted upon said receptacle, and means whereby the paste receptacle and parts carried thereby may be vertically adjusted with respect to the main runway sections.

42. In a labeling machine, labeling instrumentalities, a can feed, a paste receptacle, pasting appliances carried by the receptacle, a support to which the receptacle is slidably interlocked, a vertically adjustable supporting member for said support, and a horizontally adjustable supporting member for said vertically extending supporting means.

43. In a labeling machine, the combination with a runway or support for cans or the like, a label support, a paste receptacle, means for applying paste about the periphery of the can, means for applying paste longitudinally of the can, both of said paste applying means being mounted on the single paste receptacle.

44. In a labeling machine, a label support, a runway or support for cans or the like, and pasting appliances adapted to apply a daub of paste of limited width from end to end of the can and to apply a daub of paste entirely around the can at the junction of the can body and can top, and a common adjustable supporting means for said pasting appliance.

45. In a labeling machine, the combination of a can support or runway, can feeding mechanism, a label support, a paste receptacle and a plurality of past applying members adapted to apply paste from said receptacle to the cans, said paste applying means being movable at different relative angles.

46. In a labeling machine, the combination of a can support or runway, can feeding mechanism, a label support, a paste receptacle and a plurality of paste applying members adapted to apply paste from said receptacle to the cans, said paste applying means being movable respectively in transverse directions.

47. In a labeling machine, the combination of a runway or support for cans or the like, can feeding mechanism, a label support, a paste receptacle, and longitudinally and transversely rotatable paste applying members mounted within the receptacle and adapted to engage the periphery of the fed cans.

48. In a labeling machine, the combination of a runway or support for cans or the like, can feeding mechanism, a label support, a paste receptacle, and longitudinally and transversely rotatable paste applying members mounted within the receptacle and adapted to engage the periphery of the fed cans and a common drive for said pasting members.

49. In a labeling machine, the combination of a runway or support for cans or the like, can feeding mechanism, a label support, a paste receptacle, an elongated pasting roll extending longitudinally of the receptacle and rotatable about an axis extending longitudinally about the runway, and an auxiliary rotatable roll mounted upon an axis transverse to the axis of the first mentioned roll, said auxiliary roll also being mounted upon the paste receptacle.

50. In a labeling machine, a can support or runway, means for feeding the cans along the runway, can feeding mechanism, a label receptacle, a paste applying roll mounted upon the receptacle and movable on an axis extending longitudinally of the runway, a transversely rotatable paste applying roll also mounted upon the receptacle, and scraper members for the respective rolls mounted on the receptacle.

51. In a labeling machine, a can support or runway, means for feeding the cans along the runway, can feeding mechanism, a label receptacle, a paste applying roll mounted upon the receptacle and movable on an axis extending longitudinally of the runway, a transversely rotatable paste applying roll also mounted upon the receptacle and an adjustable support for said receptacle.

52. In a labeling machine, a can support or runway, means for feeding the cans along the runway, can feeding mechanism, a label receptacle, a paste applying roll mounted upon the receptacle and movable on an axis extending longitudinally of the runway, a transversely rotatable paste applying roll also mounted upon the receptacle, and a detachable support for said receptacle.

53. In a labeling machine, the combination with label applying instrumentalities, a can feed, a paste receptacle, a paste applying roll on the receptacle, the axis of which roll extends longitudinally of the machine, a transversely extending paste applying roll on the receptacle, and can runways or supports mounted on the receptacle to one side of the longitudinally extending roll.

54. In a labeling machine, a can support or runway, means for feeding cans or the like along the runway, a label support, a pasting roll extending across the runway, a drive shaft for said paste roll, an auxiliary paste roll extending longitudinally of the runway, a drive shaft therefor, and intermeshing gearing interposed between said drive shafts whereby the rolls are simultaneously operated.

55. In a labeling machine, the combination of a can runway or support, a label receptacle, and means for applying paste to the lap end of the label including an endless belt, and a paste guard for protecting the edges of the labels, said guard being mounted upon both stretches of the belt.

56. In a labeling machine, the combination of a can runway or support, a label receptacle, and means for applying paste to the lap end of the label including an endless belt, and a paste guard for protecting the edges of the labels, said guard being mounted for slidable movement upon both stretches of the belt and having a part adapted to engage the edges of the labels.

57. In a labeling machine, the combination of a can runway or support, a label receptacle, means for applying paste to the lap end of the label including an endless belt, and a paste guard for protecting the edges of the labels, said guard being mounted for slidable movement upon both stretches of the belt and having a part adapted to engage the edges of the labels, and an auxiliary part adapted to overlie the top of the uppermost label adjacent its edges.

58. In a labeling machine, the combination of a can runway or support, a label receptacle, paste applying mechanism for a part of the label, and paste applying mechanism for the lap end of the labels, the latter comprising an endless carrying belt the upper and lower stretches of which are arranged above the supported labels, and a paste guard for the labels having a flange engaging over the respective edges of the belt and an inclined surface engaging the lower stretches of the belt.

59. In a labeling machine, a supporting frame, a label support, a can runway or support, paste receptacles arranged to opposite sides of the label receptacle, pasting appliances mounted within said receptacles, one for the body of the can and one for the lap end of the label and means for supporting said receptacles upon the frame whereby they may be separately removed from the side of the machine.

60. In a labeling machine, a supporting frame, a label support, a can runway or support, paste receptacles arranged to opposite sides of the label receptacle, pasting appliances mounted within said receptacles, one for the body of the can and one for the lap end of the label said receptacles being mounted on suitable support guide ways extending transversely of the machine whereby they may be removed from the side of the machine by a sliding movement.

61. In a labeling machine, a supporting frame, a label support, a can runway or support, paste receptacles arranged to opposite sides of the label receptacle, pasting appliances mounted within said receptacles, one for the body of the can and one for the lap end of the label said receptacles being mounted on suitable supporting guide ways extending transversely of the machine whereby they may be removed from the side of the machine by a sliding movement, and means for holding the receptacles in position.

62. In a labeling machine, a main frame, a can support or runway on the main frame, pasting and labeling appliances, a conveyer belt arranged along the runway for feeding cans along the same, an auxiliary frame therefor, driving mechanism for the feed belt supported on the main frame, and means for changing the relative positions of the frames while maintaining a uniform driving connection.

63. In a labeling machine, a can runway or support, pasting and labeling appliances, an endless carrier for feeding the cans along the runway, a drive shaft, a rock arm mounted upon said shaft, a driven shaft carried by the rock arm, gearing interposed between the respective shafts, and a drive connection between the driven shaft and the endless carrier, whereby the latter may be vertically adjusted.

64. In a labeling machine, a can runway or support, pasting and labeling appliances, an endless carrier for feeding the cans along the runway, a drive shaft, a rock arm mounted upon said shaft, a driven shaft carried by the rock arm, gearing interposed between the respective shafts, and a drive connection between the driven shaft and the endless carrier, whereby the latter may be vertically adjusted, and means for holding the rock arm in adjusted positions.

65. In a labeling machine, a can runway or support, pasting and labeling appliances, an endless carrier for feeding the cans along the runway, a drive shaft, a rock arm mounted upon said shaft, a driven shaft carried by the rock arm, gearing interposed between the respective shafts, a chain and sprocket connection between the driven shaft and the endless carrier, whereby the latter may be vertically adjusted.

66. In a labeling machine, a can runway or support, pasting and labeling appliances, an endless carrier for feeding the cans along the runway, a drive shaft, a rock arm mounted upon said shaft, a driven shaft carried by the rock arm, gearing interposed between the respective shafts, a chain and sprocket connection between the driven shaft and the endless carrier, whereby the latter may be vertically adjusted, and means for holding the rock arm in adjusted positions.

67. In a labeling machine, a can runway or support, pasting and labeling instrumentalities, a can feed member comprising an endless carrier, a vertically adjustable support for the latter, having pulleys for the endless carrier, a drive wheel mounted upon one of the pulley shafts, a drive wheel mounted upon a stationary part of the machine, a rock arm mounted for pivotal movement upon the shaft of said drive wheel and carrying a driven shaft, gear connection between the drive and driven shafts, and an endless drive between the driven shaft and the driving wheel of the feed carrier.

68. In a labeling machine, a can runway or support, pasting and labeling instrumentalities, a can feed member comprising an endless carrier, a vertically adjustable support for the latter, having pulleys for the endless carrier, a drive wheel mounted upon one of the pulley shafts, a drive wheel mounted upon a stationary part of the machine, a rock arm mounted for pivotal movement upon the shaft of said drive wheel and carrying a driven shaft, gear connection between the drive and driven shafts, and an endless drive between the driven shaft and the driving wheel of the feed carrier, and means for holding the rock arm in adjusted position.

69. In a labeling machine, a can runway or support, pasting and labeling instrumentalities, a can feed member comprising an endless carrier, a vertically adjustable support for the latter, having pulleys for the endless carrier, a drive wheel mounted upon one of the pulley shafts, a drive wheel mounted upon a stationary part of the machine, a rock arm mounted for pivotal movement upon the shaft of said drive wheel and carrying a driven shaft, gear connection between the drive and driven shafts, an endless drive between the driven shaft and the driving wheel of the feed carrier, and means for holding the rock arm in adjusted position, said means including an elongated segmental slot in the rock arm and a retaining member arranged to pass through said slot and engage a stationary part of the frame.

70. In a labeling machine, a can runway or support, pasting and labeling appliances, feed or conveyer mechanism arranged above the runway, and means for adjusting the latter vertically, and driving mechanism for the conveyer, means including a suitably supported motor, a drive shaft projecting therefrom, a gear wheel mounted upon said shaft, a bracket arm mounted for swinging movement about an axis co-incident with said shaft, a gear wheel carried by said bracket arm and arranged to mesh with the gear of the driving shaft in the adjusted positions of said arm, and a driving connection between said gear carried by the arm and the conveyer mechanism.

71. In a labeling machine, the combination of a can runway or support, a can feed, a label support, and pasting appliances, a common drive for said feed and pasting appliances with associated means whereby the movement of the feed may be reversed independently of the pasting appliances.

72. In a can labeling machine, the combination of a can runway or support, conveyer mechanism, a label support, pasting appliances, driving mechanism for the conveyer mechanism and pasting appliances, means whereby the movement of the conveyer mechanism may be reversed, and for preventing the reverse movement of the pasting appliances.

73. In a can labeling machine, the combination of a can runway or support, conveyer mechanism, a label support, pasting appliances, driving mechanism for the conveyer mechanism and pasting appliances, means whereby the movement of the conveyer mechanism may be reversed, and associated means acting automatically upon the reversal of the movement of the conveyer mechanism to stop the movement of the pasting apliances.

74. In a labeling machine, the combination of a can runway or support, conveyer mechanism, a label support, pasting appliances, driving mechanism for the conveyer mechanism, driving mechanism for the pasting appliances, and a releasable coupling between said driving mechanisms.

75. In a can labeling machine, the combination of a can runway or support, conveyer mechanism, a label support, pasting appliances, driving mechanism for the conveyer mechanism, driving mechanism for the pasting appliances, and a releasable coupling between said driving mechanisms, said coupling member constructed and arranged to permit an independent reverse movement of the conveyer mechanism.

76. In a labeling machine, the combination of a can runway or support, a label support, can feeding mechanism, a drive for the latter, paste applying mechanism arranged to one side of the label support, paste applying mechanisms arranged at the opposite side of the label support, and releasable driving mechanism for the paste applying mechanisms adapted to receive its movement from the movement of the conveyer mechanism.

77. In a labeling machine, the combination of a can runway or support, a label support, can feeding mechanism, a drive for the latter, paste applying mechanism arranged to one side of the label support, paste applying mechanism arranged at the opposite side of the label support, driving mechanism for the paste applying mechanisms adapted to receive its movement from the movement of the conveyer mechanism, and means whereby the movement of the paste applying mechanisms is stopped by a reverse movement of the conveyer mechanism.

78. In a labeling machine, a runway or support for cans or the like, a label support, paste applying mechanism for one end of the label and paste applying mechanism for the lap end of the label, driving mechanism interposed between the two paste applying mechanisms, the driving mechanism including releasable sections permitting either of said paste applying mechanisms to be independently removed as a complete unit.

79. In a labeling machine, a runway or support for cans or the like, a label support, paste applying mechanism for one end of the label and paste applying mechanism for the lap end of the label, a releasable sectional driving mechanism interposed between the two paste applying mechanisms permitting either of said paste applying mechanisms to be independently removed intact.

80. In a labeling machine, a runway or support for cans or the like, a label support, paste applying mechanism for one end of the label and paste applying mechanism for the lap end of the label, a releasable driving mechanism interposed between the two paste applying mechanisms with associated means whereby either of said paste applying mechanisms may be independently removed, said driving connection including a flexible shaft formed in sections.

81. In a labeling machine, a runway or support for cans, pasting and labeling mechanisms, a movable paste member for the lap end of a label, a drive shaft for the latter, said shaft being formed in sections, with one section carried by the paste receptacle for said movable paste applying member, and a releasable coupling mechanism between the two sections of the shaft whereby the paste receptacle with said paste applying member may be removed.

82. In a labeling machine, a runway or support for cans, pasting and labeling mechanisms, a movable paste member for the lap end of a label, a drive shaft for the latter, said shaft being formed in sections, with one section carried by the paste receptacle for said movable paste applying member, and a releasable coupling mechanism between the two sections of the shaft whereby the paste receptacle with said paste applying member may be removed and a temporary support for the other section of the shaft.

83. In a labeling machine, a main frame, a can runway on the main frame, pasting and labeling instrumentalities upon the main frame, an auxiliary frame positioned above the main frame, feed mechanism for the cans positioned on the auxiliary frame, a motor and drive mechanism positioned on the main frame, means whereby the auxiliary frame may be adjusted vertically, and an adjustable drive connection between said driving mechanism on the main frame and the feeding mechanism on the auxiliary frame.

84. In a labeling machine, the combination of a runway for cans or the like, can feeding mechanism, a label support, a paste receptacle, an elongated rotatable roll in the receptacle extending longitudinally of the runway, and an auxiliary paste applying device in said receptacle.

85. In a labeling machine, a main frame having a can runway and pasting and labeling mechanism, overhanging brackets adjacent opposite ends of the main frame, an elongated auxiliary frame adjustably mounted on said brackets, oppositely disposed relatively narrow feeding belts mounted on the auxiliary frame and an intermediate relatively wide presser belt between the relatively narrow belts positioned on the auxiliary frame.

86. In a labeling machine, a main frame having a can runway and pasting and labeling mechanism, overhanging brackets adjacent opposite ends of the main frame, an elongated auxiliary frame adjustably mounted on said brackets, oppositely disposed relatively narrow feeding belts mounted on the auxiliary frame and an intermediate relatively wide presser belt between the relatively narrow belts positioned on the auxiliary frame, and a common drive for said belts.

87. In a labeling machine, a main frame having a can runway and pasting and labeling mechanism, overhanging brackets adjacent opposite ends of the main frame, an elongated auxiliary frame adjustably mounted on said brackets, oppositely disposed relatively narrow feeding belts mounted on the auxiliary frame and intermediate relatively wide presser belt between the relatively narrow belts positioned on the auxiliary frame, driving mechanism on the main frame for the pasting instrumentalities and an adjustable driving connection between said driving mechanism and said belts, substantially as and for the purpose described.

88. In a can labeling machine, a runway or support for cans, means for moving the cans along the runway, and oppositely disposed guides along the runway, and substantially coextensive therewith for opposite ends of the cans, one of said guides being rigid and the other comprising a single piece thin metal strip of a consistency to yield upon itself at substantially every point throughout the length thereof, and spaced yieldable supports for said metal strip.

89. In a can labeling machine, a can runway, and oppositely disposed guide rails for the ends of the can, one of said guide rails being fixed and the other comprising a continuous unbroken thin flat highly elastic metallic strip, whereby substantially every portion of said strip is adapted to yield relative to other portions thereof, and said guide rails being substantially coextensive with one another and with the runway.

90. In a labeling machine, a runway for cans and the like, labeling mechanism, pasting mechanism, a feed belt positioned above the runway, roller supports for the feed belt, driving mechanism for one of said rollers, whereby to impart movement to the feed belt, said driving mechanism being reversible whereby to impart reverse movement to the cans along the runway, and means associated with said driving mechanism for interrupting the movement of the other mechanism during said return movement of the cans.

91. In a can labeling machine, labeling instrumentalities, and a can runway including a continuous unbroken flexible guide rail automatically yieldable so as to frictionally engage the can at all points of the runway.

In testimony whereof I affix my signature in presence of two witnesses.

WILLIAM H. LEISTER.

Witnesses:
W. L. ELINE,
FENBY L. HERING.